Figure 7:
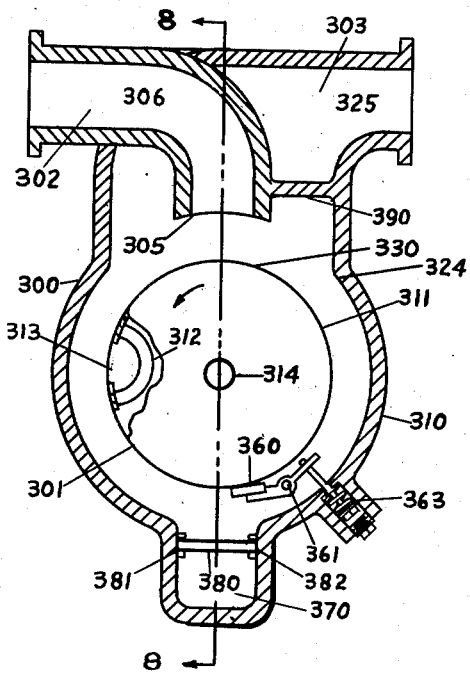

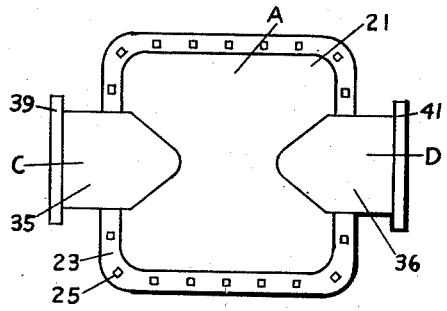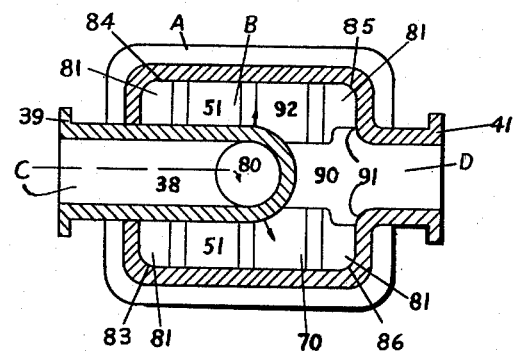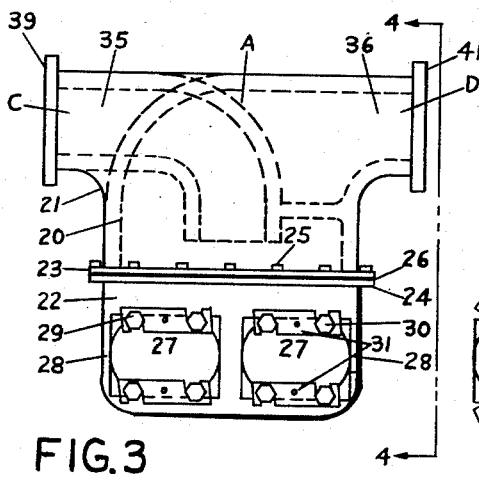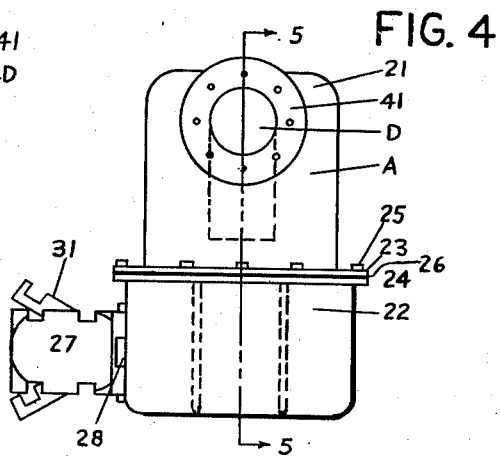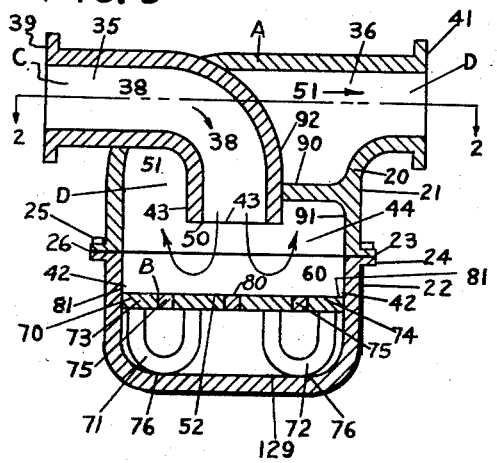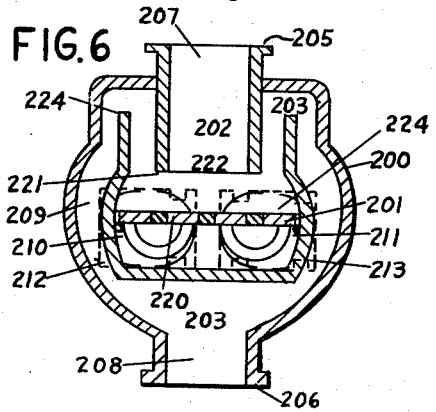
INVENTOR.
BRUNO E. PREVOST
BY Pearson + Pearson
ATTORNEYS July 9, 1957  B. E. PREVOST  2,798,611
MAGNETIC SEPARATOR Filed March 27, 1953  2 Sheets-Sheet 2

INVENTOR.
BRUNO E PREVOST
BY
Pearson + Pearson
ATTORNEYS 2,798,611
Patented July 9, 1957

2,798,611

MAGNETIC SEPARATOR

Bruno E. Prevost, West Boxford, Mass., assignor to John W. Bolton & Sons, Inc., Lawrence, Mass., a corporation of Massachusetts Application March 27, 1953, Serial No. 345,208

9 Claims. (Cl. 210—222)

This invention relates to magnetic separators of the type designed to be incorporated in a fluid conduit to separate tramp metal from the fluid.

Magnetic separators have heretofore been proposed in which a flat magnetic plate is placed at an angle to the flow of the fluid through a conduit as in U. S. Patent 2,612,268 to Merwin, dated September 30, 1952, and in a prior application of the applicant herein Serial Number 158,675, filed April 28, 1950, now Patent No. 2,636,208. Such separators have also been provided with a magnetic plate set perpendicularly across the path of the fluid in a conduit with the fluid contacting the plate head-on, then passing under a baffle and across the plate and then leaving the plate perpendicularly as in U. S. Patent 2,464,628 to Willard dated March 15, 1949. All of these separators have, however, been so constructed that the fluid, even though its direction may be changed within a single plane, flows from the inlet, across the face of the plate and out the outlet in a direct course. Thus the magnetic plate must not only attract the tramp metal, or metal particles, but must also overcome the advancing force of the fluid which tends to slide the metal across the face of the plate and thence out the outlet. This is especially true when the metal has accumulated into a pile adjacent the outlet conduits of such separators.

The principal object of this invention is to provide a magnetic separator in which the magnetic plate is perpendicular to the path of the fluid and the fluid is moved across the face of the plate in all directions except in the direction of the outlet. Thus there is no tendency for tramp metal to travel directly out the outlet without being stopped by the magnetic plate and no tendency for metal once on the plate, to be swept directly out of the separator by the force of the fluid.

Another object of the invention is to provide a magnetic separator in which an inlet pipe delivers the fluid perpendicularly against the centre of a magnetic plate, the fluid then fanning out over the entire plate to sweep any tramp metal into the corners of the separator before leaving the plate perpendicularly. The accumulation of metal in the corners does not decrease the area of the flow with its consequent increase in velocity, thus avoiding the flushing out of such metal from the separator.

Still another object of the invention is to provide a magnetic separator with concentric inlet and outlet pipes, the space between the terminal end of the inlet and a parallel magnetic plate being large enough to decrease the velocity of the fluid thereby giving a longer period of time for the operation of the magnets and the separator being so constructed as to form an effective trap for heavy metal even without the magnetic plate.

A further object of the invention is to provide a magnetic separator which by reason of the outlet pipe encircling the inlet pipe and the inlet pipe being directed at the centre of a magnetic plate, enables smaller sized magnets with a smaller flux pattern to be effective in large sized conduits. Thus in conduits of twelve inches or more in diameter, instead of using a wider housing of lessened height or large magnets with a high flux pattern, the separator of this invention uses the same size magnets as are used for conduits of twelve inches or less and the separator housing is only a few inches larger than the conduit in diameter.

A still further object of the invention is to provide a magnetic separator having a quadrangular housing traversed by a magnetic plate, oppositely disposed elbow conduits forming a concentric inner and outer passage and a baffle plate positioned in the plane of the elbows to prevent direct passage of fluid from one elbow into the other.

Another object of the invention is to provide in such a magnetic separator, a magnetic plate mounted to rotate in a closed path whereby the accumulation of metal thereon may be periodically scraped into a collection chamber and the chamber periodically cleaned without stopping the flow of fluid.

Other objects and advantages will be evident in the description of the drawings which represent a preferred embodiment of the invention.

Figure 8:
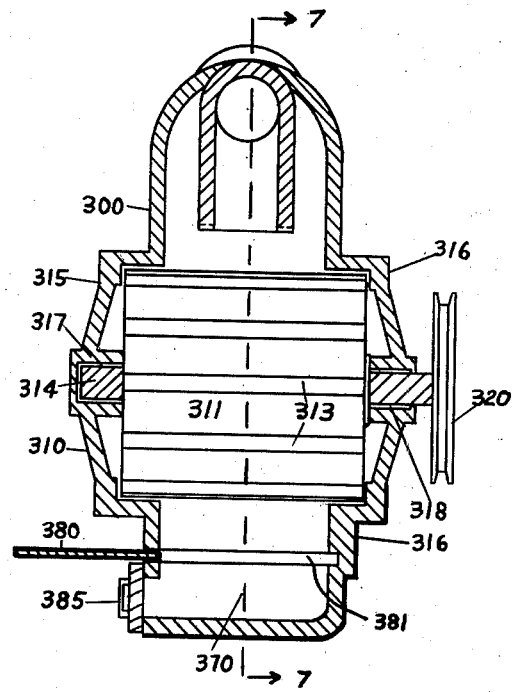

In the drawings:

Fig. 1 is a plan view of the preferred form of the invention.
Fig. 2 is a plan view in section on line 2—2 of Fig. 5.
Fig. 3 is a side elevation of the device shown in Fig. 1.
Fig. 4 is an end elevation of the device shown in Fig. 1.
Fig. 5 is a side elevation in section on line 5—5 of Fig. 4.
Fig. 6 is a view similar to Fig. 5 of a modification.
Fig. 7 is a view similar to Fig. 5 of another modification and
Fig. 8 is an end view in section on line 8—8 of Fig. 7.

In Figs. 1–5 a magnetic separator, according to this invention, is illustrated including housing means A, magnetic means B, fluid inlet means C and fluid outlet means D.

Housing means A includes a liquid tight housing 20, having an upper section 21 and a lower section 22, each section having flanges such as 23 and 24 detachably joined by bolts such as 25 and separated by a suitable gasket 26. A pair of clean out doors such as 27, 27 are hinged at 28, 28 to one side of the lower section 22 to provide access to the interior thereof for cleaning off any accumulation of metal on magnetic means B. Each door such as 27 is secured by bolts such as 29 and 30 on housing 20 when in locked position and may have a pivoted latch member such as 31 to permit easy unfastening thereof.

The upper section 21 of liquid tight housing 20 is preferably in the form of a pair of oppositely extending elbows 35 and 36, one of the elbows such as 35 being the fluid inlet means of the preferred form of the device and the other elbow such as 36 being the fluid outlet means of the preferred form of the device. Elbow 35 is of the same diameter throughout as the conduit in which the magnetic separator is coupled and forms therewithin a fluid inlet passage 38 of uniform diameter from the connecting plate 39 to its terminal end 43 within the housing 20. Elbow 36, however, while of the same diameter as the conduit in which the magnetic separator is coupled, adjacent the connecting plate 41, is enlarged intermediate thereof at 44 and adjacent its terminal end 42 thereby forming a fluid outlet passage 51 which entirely encircles the terminal end 43 of elbow 35. The terminal end 43 of elbow 35 thus forms a fluid inlet passage 38 concentrically arranged within a fluid outlet passage 51 formed by the terminal end 42 of elbow 36. Preferably the cross sectional area of the passage 51, thus formed, is approximately equal to the cross sectional area of passage 38 and of the conduit into which the passages connect.

The plane of the terminal end of the inlet passage of the various embodiments of the magnetic separator illustrated herein is called the plane at which fluid exits from the inlet passage and enters the field of magnetic attraction of the magnetic means B thereof. The plane of the terminal end of the outlet passage is called herein the plane at which fluid commences to reverse direction and leave the field of magnetic attraction of the magnetic means B. Thus in the preferred embodiment shown in Figs. 1–5 the plane of the terminal end of the inlet passage 38 is shown at 50 and is on the level of the inflow mouth of the passage 38. The plane of the terminal end of the outlet passage 51 is shown at 52 and is at the portion of housing 20 and outlet passage 51 on the level of the magnetic means B. Plane 50 is at a level above the level of plane 52 and is thus spaced from magnetic means B to provide a settling chamber 60, preferably capable of accommodating a greater volume of fluid than passages 38 or 51, in which chamber the fluid is exposed to the magnetic flux of magnetic means B and its velocity temporarily slowed.

Magnetic means B includes a magnetic plate 70 having one or more permanent magnets 71, 72 of horseshoe shape and having elongated bars 73, 74 of magnetizable material extending along the opposite poles of each magnet the full width of the housing 20, and separated by bars such as 75 of non-magnetizable material. The bottom 76 of each magnet 71 or 72 rests on the bottom 129 of housing 20 thereby spacing the plate at the correct distance from terminal end 43 of inlet passage 38 to assure that all fluid discharged therefrom passes through the fields of attraction of plate 70. Preferably magnetic plate 70 is in a flat plane parallel to the plane 50 of terminal end 43 of inlet passage 38.

Fluid from the conduit in which the separator is coupled is delivered from the terminal end 43 perpendicularly against the centre 80 of magnetic plate 70, then fans out toward the peripheral position 81 of the plate and then mushrooms around terminal end 43 in a direction parallel to the path of delivery to the plate but encircling that path. Any tramp metal or metal particle, by inertia, is forced downwardly against the plate and also drawn downwardly by the attraction of the magnets and once on the plate, is slid across the face by the force of the fluid out to the peripheral edge of plate 70 where it may be accumulated without interfering with the flow of fluid by closing a gap in the passages of housing 20.

Preferably the lower portion of housing 20 is quadrangular and plate 70 is quadrangular while the terminal end 43 of passage 38 is circular in cross section. Thus corners such as 83, 84, 85 and 86 are formed into which the metal is forced. Preferably also a baffle or partition plate 90 is provided extending transversely from the inner wall 91 of outlet passage 51 to the outer wall 92 of inlet passage 38 in a plane parallel to plane 50. Baffle 90 is of a width approximately equal to the diameter of inlet passage 38 and is aligned with the direction of the elbows whereby fluid emitted from terminal end 43 cannot flow directly therefrom into passage 51 too rapidly to be affected by plate 70. Thus, in the preferred embodiment of the invention, while magnetic plate 70 is reversing the path of the fluid through an angle of 180°, baffle 90 permits that reversal of path to take place around 360° of circumference without danger of the particles near the outlet segment of the circumference being swept out the outlet.

A modification is shown in Fig. 6 comprising a housing 200, magnetic plate 201, inlet passage 202 and outlet passage 203. Preferably the housing 200 is coupled into a vertical conduit by coupling plates 205 and 206 and instead of oppositely extending elbows such as 35 and 36, oppositely extending aligned pipes 207 and 208 are provided. Pipe 208 is enlarged to form the housing 200 and is generally circular in cross section except that one side thereof is flattened at 209. One or more cleanout openings 210, 211, closed by doors 212, 213 are provided on the flat side 209 of housing 200 and a cup shaped partition 213 is also supported on the flat side 209. Within the cup shaped partition 213, a flat magnetic plate 220 is mounted having its surface spaced from and parallel to the plane 221 of the terminal end 222 of inlet passage 202. The terminal end 224 of outlet passage 203 is formed by the cup shaped partition 213 which encircles passage 202 and guides the fluid first in a path around passage 202 and then back around the outside of partition 213 to the pipe 208. No baffle similar to baffle plate 90 is required in this embodiment since the outlet pipe 208 is opposite inlet pipe 207, on the opposite side of plate 220, rather than on the same side and aligned with the inlet pipe as in Figs. 1–5. The bulge of partition 213 provides space adjacent the periphery of plate 220 for the accumulation of metal fragments corresponding to the corners of the preferred embodiment.

In Figs. 7 and 8 another modification of the invention is illustrated which includes housing means 300, magnetic means 301, fluid inlet means 302 and fluid outlet means 303. Inlet means 302 and outlet means 303 are similar to inlet means C and outlet means D except that the plane of the terminal end 305 of inlet passage 306 is curved rather than flat. Housing 300 is cylindrical in its lower portion 310 to accommodate a magnetic drum or pulley 311 constituting the magnetic means 301 of this embodiment. Drum 311 is made up of permanent horseshoe magnets 312 and magnetic bars 313 and is mounted for rotation on a shaft 314 journalled at 317, 318 in each opposite side 315, 316 of lower portion 310 of housing means 300. A pulley 320 is fixed to shaft 314 outside housing means 30 and driven by suitable power means such as an electric motor. The curved plane of terminal end 305 is in rear of the curved plane 330 of the surface of magnetic drum 311, the drum being in the plane of the terminal end 324 of outlet passage 325 and extending transversely thereacross. A baffle 390, similar to 90, is provided as is a scraper blade 360 and metal accumulation chamber 370. Scraper 360 is pivoted on a shaft 361 extending between sides 315 and 316 of housing means 300 and spring pressed into contact with drum 311 by a spring 363. A shutoff gate 380 is mounted to slide in tracks 381, 382 between chamber 370 and drum 311 and is normally open. However, gate 380 may be closed to isolate the chamber 370 whereupon cleanout door 385 may be opened to remove metal from chamber 370. Metal accumulating on bars 313 is carried around the slowly revolving drum 311 to be scraped off by scraper 360 and fall into chamber 370.

I claim:

1. A magnetic separator comprising a liquid tight housing adapted to be coupled into a fluid conduit, said housing having a fluid inlet and a fluid outlet passage extending in the same direction within the upper portion thereof, one said passage having a terminal end concentrically arranged within, but at a level above the level of the terminal end of the other passage and magnetic means within said housing, said means including an upwardly directed magnetic face at a spaced uniform distance opposite to and below the level of the terminal end of the encircled passage, said upwardly directed magnetic face extending transversely of the terminal end portion of the encircling passage over an area larger than the area of the terminal end of the encircled passage and adapted to reverse a stream issuing therefrom annularly around said stream in cooperation with said encircling passage.

2. A combination as specified in claim 1 plus means for rotating said upwardly directed magnetic face in a closed path within said housing and scraper means in said path for removing magnetized matter from said face.

3. A combination as specified in claim 1 wherein there are a plurality of identical magnetic faces within said housing forming a closed figure of uniform cross section, certain of said plurality of magnetic faces being upwardly directed, means for rotating said figure about a central axis of rotation within said housing and scraper means within said housing for removing magnetized matter from the faces of said figure during the rotation thereof.

4. A magnetic separator comprising a liquid tight housing adapted to be coupled into a liquid conduit, said housing having an influent passage and an effluent passage extending downwardly and coaxially therewithin, the influent passage having an inflow mouth concentrically within the effluent passage and in a plane axially spaced a predetermined uniform distance above the plane of the terminal end of the effluent passage and an imperforate magnetic member within said housing, said member having a magnetic face of greater area than the area of said inflow mouth extending transversely in the plane of the terminal end of the effluent passage with its central area opposite said inflow mouth and adapted to cooperate with said effluent passage in converting the influent path of liquid into a reversely directed annular path around said influent path.

5. A combination as specified in claim 4 wherein said influent passage is circular in cross section and the terminal portion of said effluent passage proximate said magnetic face is quadrangular in cross section to thereby form a settling chamber with angular corners for accumulating separated tramp metal without blocking the flow of liquid therethrough.

6. A combination as specified in claim 4 wherein the influent passage and the effluent passage of said housing are integral therewith and formed as oppositely extending elbows each adapted to be coupled into a liquid conduit.

7. A combination as specified in claim 6 wherein the effluent passage in the effluent elbow contains a transverse imperforate partition adapted to prevent direct liquid flow from said inflow mouth out said effluent passage.

8. In a magnetic separator the combination of housing means adapted to be coupled into a liquid conduit and having a liquid tight settling chamber in the lower portion thereof; magnetic means intermediate of the lower portion of said settling chamber including an upwardly directed magnetic face extending transversely substantially over the entire intermediate area thereof; influent means integral with said housing adapted to deliver a compact stream of liquid from said conduit against said magnetic face and effluent means integral with said housing and merging with the walls of said settling chamber, said effluent means being adapted to reversely conduct liquid away from said magnetic face annularly around said compact stream.

9. In a magnetic separator of the type having a liquid tight housing adapted to be coupled into a liquid conduit, a liquid settling chamber within the housing and a member having a magnetic face extending transversely of said settling chamber the combination of a liquid inlet conduit integrally formed in said housing and having an inflow mouth, at a uniform spaced distance above a central area of said magnetic face, adapted to direct liquid substantially perpendicularly thereagainst and a liquid outlet conduit integrally formed in said housing, said outlet conduit having an intermediate portion coaxial with the inflow mouth portion of said inlet conduit and encircling the same and having a terminal portion below said inflow mouth and at the level of said magnetic face adapted to conduct liquid away from the area of said face surrounding said central area in a reverse direction parallel to and around liquid emitted from said inflow mouth.

References Cited in the file of this patent

UNITED STATES PATENTS

| | | |
|---|---|---|
| 536,364 | White | Mar. 26, 1895 |
| 1,263,406 | Hadley | Apr. 23, 1918 |
| 2,464,628 | Willard | Mar. 15, 1949 |
| 2,635,754 | Stem | Apr. 21, 1953 |
| 2,636,608 | Provost | Apr. 28, 1953 |

FOREIGN PATENTS

| | | |
|---|---|---|
| 538,735 | Germany | Nov. 16, 1931 |